(12) United States Patent
Iida et al.

(10) Patent No.: US 12,343,834 B2
(45) Date of Patent: Jul. 1, 2025

(54) POWER TOOL DUST COLLECTION ATTACHMENT AND POWER TOOL

(71) Applicant: MAKITA CORPORATION, Anjo (JP)

(72) Inventors: Hitoshi Iida, Anjo (JP); Masanori Furusawa, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 18/631,902

(22) Filed: Apr. 10, 2024

(65) Prior Publication Data

US 2024/0416471 A1   Dec. 19, 2024

(30) Foreign Application Priority Data

Jun. 13, 2023   (JP) ................. 2023-097208

(51) Int. Cl.
| | |
|---|---|
| B23Q 11/00 | (2006.01) |
| A47L 5/22 | (2006.01) |
| A47L 7/00 | (2006.01) |
| A47L 9/28 | (2006.01) |
| B25D 17/20 | (2006.01) |

(52) U.S. Cl.
CPC ............ *B23Q 11/0046* (2013.01); *A47L 5/22* (2013.01); *A47L 7/0095* (2013.01); *A47L 9/2878* (2013.01); *A47L 9/2884* (2013.01); *B23Q 11/0071* (2013.01); *B25D 17/20* (2013.01); *B25D 2217/0065* (2013.01)

(58) Field of Classification Search
CPC ..... A47L 9/2878; A47L 7/0095; B25D 17/20; B23Q 11/0046; B23Q 11/0071
See application file for complete search history.

(56) References Cited

U.S. PATENT DOCUMENTS

2004/0251041 A1* 12/2004 Grossman .............. B23Q 37/00
173/217
2023/0173629 A1* 6/2023 Tagami .................. B04C 5/185
408/67

FOREIGN PATENT DOCUMENTS

JP   2022-040593 A   3/2022

* cited by examiner

*Primary Examiner* — Daniel Jeremy Leeds
(74) *Attorney, Agent, or Firm* — Oliff PLC (57) ABSTRACT

A self-suction dust collection attachment including a dust collection motor and a fan can be mechanically coupled and electrically connected to multiple types of power tools. A dust collection attachment attachable to a first power tool includes a casing, a suction portion, a dust collector that captures dust sucked through the suction portion, a fan that generates a suction force in the suction portion, a dust collection motor that rotates the fan, and an adapter attachable to at least a second power tool and detachably attachable to the casing. The adapter includes a mechanical coupler that couples the casing and the second power tool and an electrical connector that electrically connects the dust collection attachment and the second power tool when the dust collection attachment is coupled to the second power tool.

20 Claims, 8 Drawing Sheets

POWER TOOL DUST COLLECTION ATTACHMENT AND POWER TOOL

CROSS-REFERENCE TO RELATED APPLICATIONS

This application claims the benefit of priority to Japanese Patent Application No. 2023-097208, filed on Jun. 13, 2023, the entire contents of which are hereby incorporated by reference.

BACKGROUND

1. Technical Field

The disclosure relates to a dust collection attachment attachable to a power tool to collect dust produced by the power tool in use and to a power tool to which the dust collection attachment is attachable.

2. Description of the Background

When a power tool such as a hammer drill is used to machine a target material such as a concrete or stone piece, a dust collection attachment is attached to the power tool to avoid dispersion of dust produced from the target material. The dust collection attachment includes a suction portion that sucks dust and a dust collector that collects sucked dust, as described in Japanese Unexamined Patent Application Publication No. 2022-40593 (hereafter, Patent Literature 1). In the system described in Patent Literature 1, when a dust collection device is attached to a power tool, the dust collection path in the dust collection device connects with the internal space of the power tool that includes a fan. As the fan rotates in response to driving of the power tool, a suction force occurs in the suction portion in the dust collection device and causes the sucked dust to be collected in the dust collector.

The system described in Patent Literature 1 includes an adapter to couple the dust collection device to different power tools, which have mounting portions for dust collection devices with different shapes at different positions. Each power tool thus uses a dust collection device manufactured for the power tool. This causes dust collection devices to be less versatile. The adapter allows one dust collection device to be attached to multiple types of power tools.

BRIEF SUMMARY

In the known system, a power tool and the dust collection attachment are simply coupled mechanically. Thus, for a self-suction dust collection attachment that includes a motor and a fan for dust collection, the dust collection attachment does not allow signal transmission or power supply from the power tool to the dust collection attachment and cannot use the adapter.

One or more aspects of the disclosure are directed to a self-suction dust collection attachment including a dust collection motor and a fan that can be mechanically coupled and electrically connected to multiple types of power tools, and to a power tool with such a dust collection attachment.

A first aspect of the disclosure provides a power tool dust collection attachment attachable to a first power tool, the dust collection attachment including:
a casing;
a suction portion;
a dust collector configured to capture dust sucked through the suction portion;
a fan configured to generate a suction force in the suction portion;
a dust collection motor configured to rotate the fan; and
an adapter attachable to at least a second power tool and detachably attachable to the casing, the adapter including
a mechanical coupler configured to couple the casing and the second power tool, and
an electrical connector configured to electrically connect the dust collection attachment and the second power tool when the dust collection attachment is coupled to the second power tool.

A second aspect of the disclosure provides a power tool, including:
the power tool dust collection attachment according to the above aspect; and
the adapter attachable to the power tool dust collection attachment.

The technique according to the above aspects of the disclosure allows the dust collection attachment that is a self-suction dust collection attachment including the dust collection motor and the fan to be mechanically coupled and electrically connected to the power tool and the second power tool.

DETAILED DESCRIPTION

First Embodiment

Figure 1:
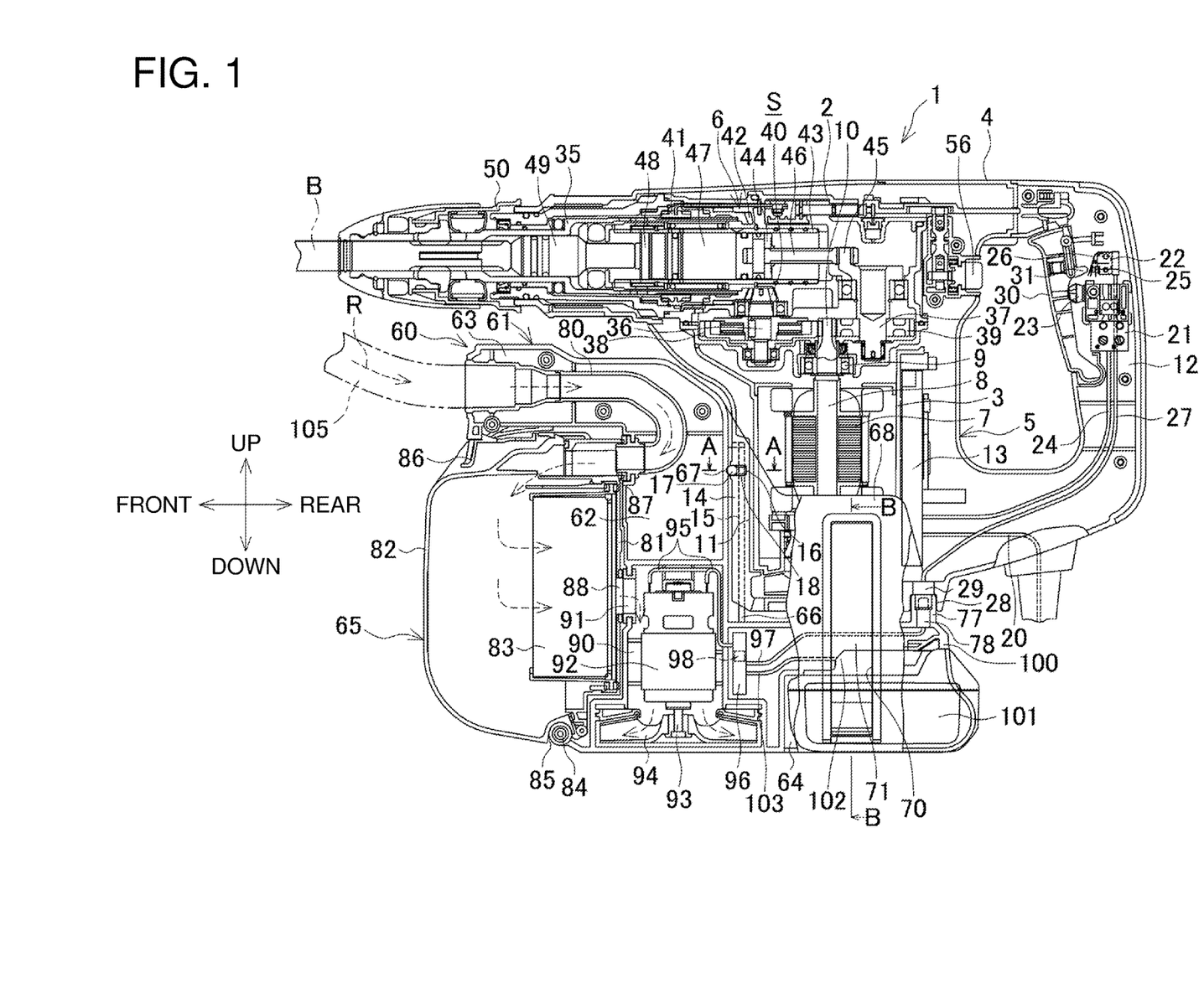
FIG. 1 is a longitudinal central sectional view of a dust collection system for a power tool in which a power tool dust collection attachment is directly attached to a hammer drill.

Embodiments of the disclosure will now be described with reference to the drawings. FIG. 1 is a longitudinal central sectional view of an example dust collection system S for a power tool (hereafter simply referred to as a dust collection system) in which a dust collection attachment 60 is directly attached to a hammer drill 1 without using an adapter (described later).

The hammer drill 1 will first be described. The hammer drill (a first power tool) 1 includes a housing including an inner housing 2, a motor housing 3, an upper outer housing 4, and a lower outer housing 5. The inner housing 2 accommodates a striking assembly 6 extending in the front-rear direction. The motor housing 3 is connected to a lower portion of the inner housing 2. The motor housing 3 accommodates a motor 7. The motor 7 is held in the motor housing 3 with a rotational shaft 8 extending upward. The rotational shaft 8 has its upper portion supported by a bearing 9 held in the inner housing 2. The rotational shaft 8 includes, on its upper end, a pinion 10 protruding into the inner housing 2.

The upper outer housing 4 is located above the motor housing 3 and covers the outer surface of the inner housing 2.

The lower outer housing 5 includes a front cylinder 11 and a handle 12. The front cylinder 11 covers the outer surface of the motor housing 3 from below. The front cylinder 11 accommodates a tool-body controller 13 behind the motor housing 3. The tool-body controller 13 includes a control circuit board (not shown) and extends vertically.

Figure 2:
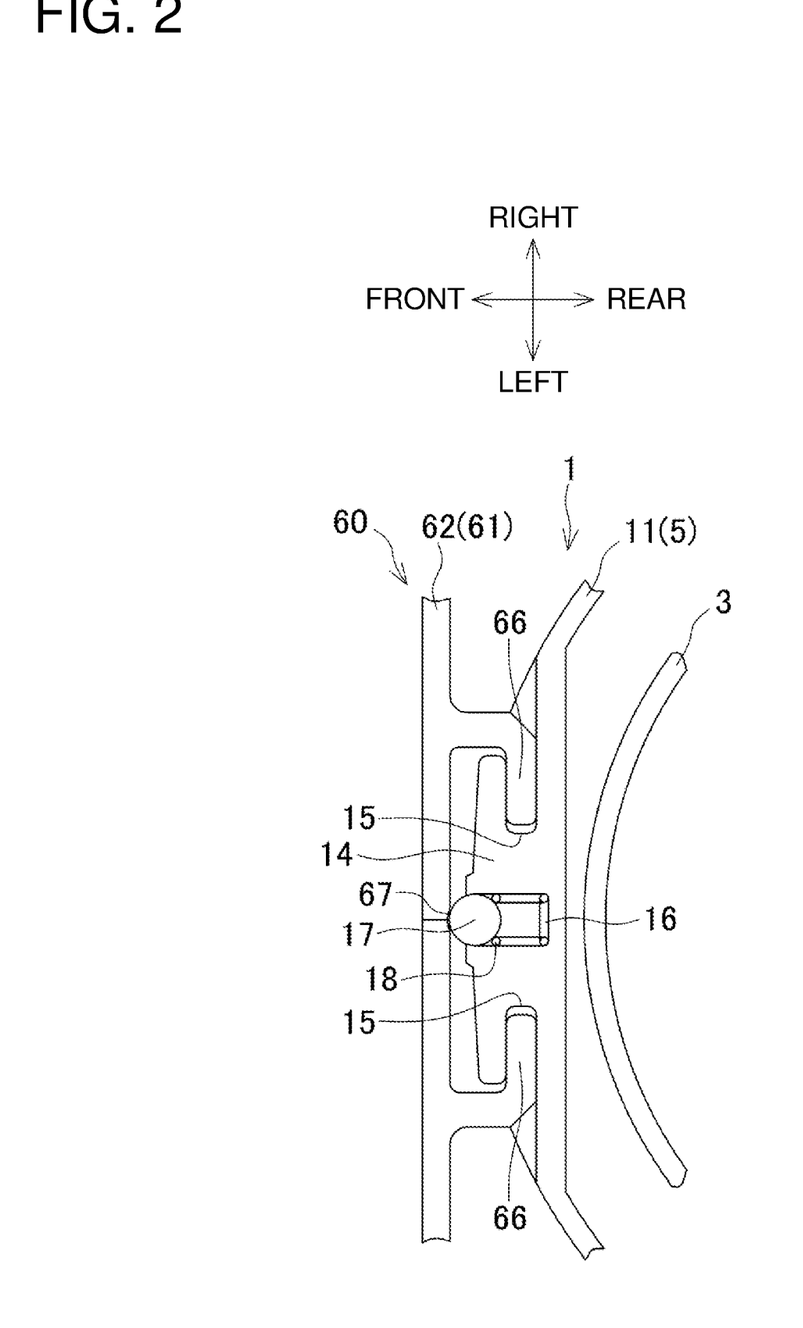
FIG. 2 is an enlarged sectional view taken along line A-A in FIG. 1.

The front cylinder 11 includes a tool-body coupler 14 at the lateral center of its front surface. As shown in FIG. 2, the tool-body coupler 14 is a ridge extending vertically with its horizontal cross section in the front-rear and lateral directions being T-shaped. The tool-body coupler 14 has a pair of right and left engagement grooves 15. Each engagement groove 15 extends upward from the lower end of the front cylinder 11. The tool-body coupler 14 has a blind hole 16 being open frontward at its lateral center. The blind hole 16 extends in the front-rear direction. The blind hole 16 receives a ball 17. The blind hole 16 has an opening diameter slightly smaller than the diameter of the ball 17. The blind hole 16 accommodates a coil spring 18 behind the ball 17. The ball 17 is urged by the coil spring 18 to a protruding position at which the ball 17 partially protrudes from the opening of the blind hole 16.

Figure 3:
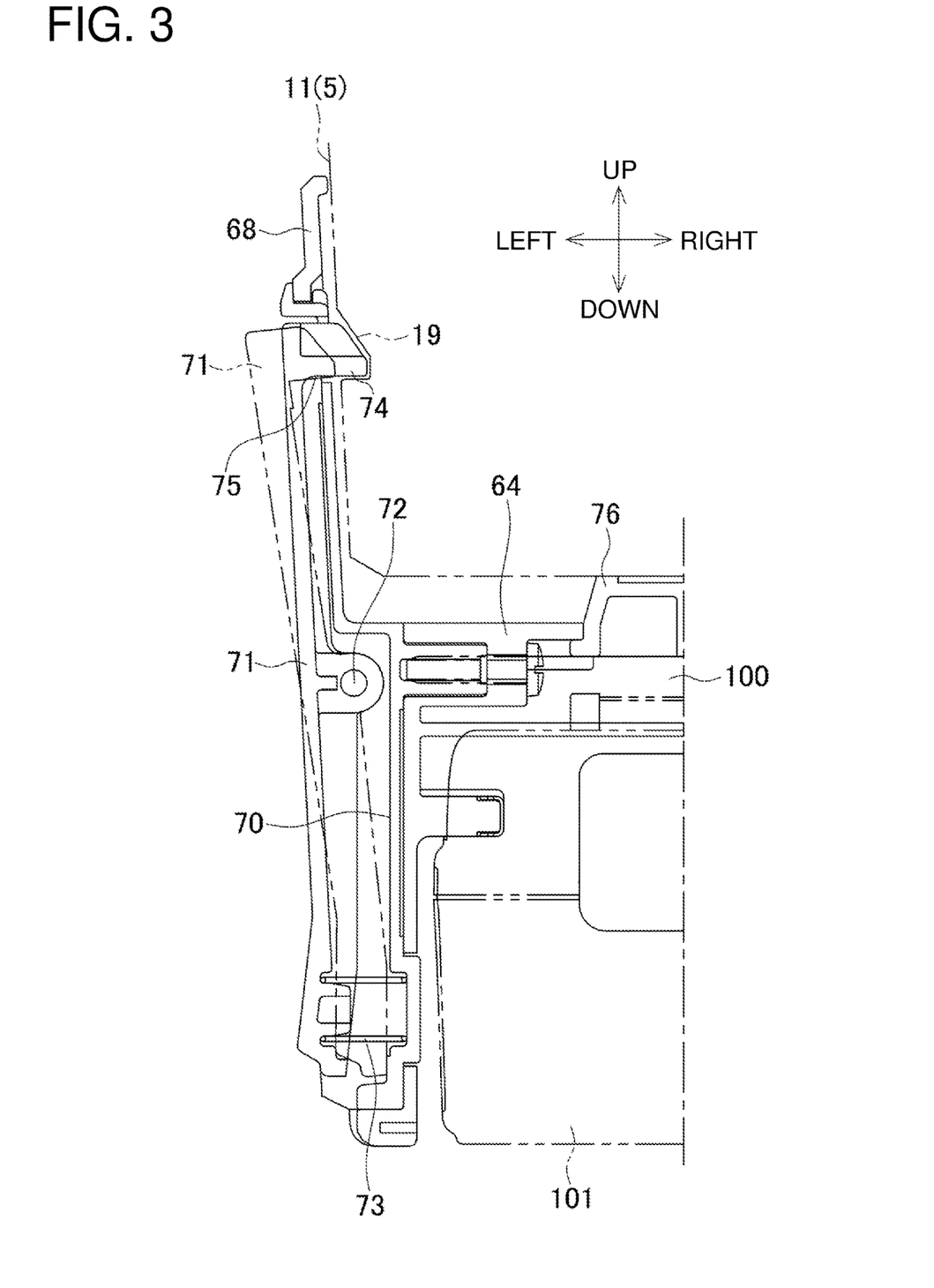
FIG. 3 is an enlarged view of a left half of the portion indicated by line B-B in FIG. 1.

As shown in FIG. 3, the front cylinder 11 has engagement recesses 19 for receiving the dust collection attachment 60 on its left and right side surfaces. The engagement recesses 19 extend in the front-rear direction.

The handle 12 extends rearward from a lower portion of the front cylinder 11 and then upward to connect to the rear end of the upper outer housing 4.

The handle 12 is connected to a power cable 20 on its lower portion. The power cable 20 is electrically connected to the tool-body controller 13. The handle 12 includes a main switch 21 and a subswitch 22 above the power cable 20. The main switch 21 pushes a plunger 23 forward. The main switch 21 is connected to a main lead wire 24. The main lead wire 24 is electrically connected to the tool-body controller 13. The main lead wire 24 transmits an input on-signal to the tool-body controller 13 in response to a push on the plunger 23.

The subswitch 22 pushes a plunger 25 forward. The subswitch 22 includes a lever 26 on its front portion. The subswitch 22 is connected to a sub-lead wire 27. The sub-lead wire 27 extends between the main switch 21 and the inner surface of the handle 12 downward in the handle 12.

The lower surface of the front cylinder 11 in the lower outer housing 5 has a connection port 28 below the tool-body controller 13. The connection port 28 is open downward. The connection port 28 includes a female connector 29 extending downward. The sub-lead wire 27 is connected to the female connector 29.

A switch lever 30 is located frontward from the main switch 21 and the subswitch 22. The switch lever 30 is located in the handle 12 in a manner pivotable in the front-rear direction about its lower end. In a normal state, the switch lever 30 is in contact with the plunger 23 in the main switch 21 and protrudes frontward from the handle 12. The switch lever 30 includes a press portion 31 above the position at which the switch lever 30 is in contact with the plunger 23. The press portion 31 is located frontward from the lever 26 in the subswitch 22.

When the protruding switch lever 30 is pushed backward, the switch lever 30 pushes the plunger 23 to turn on the main switch 21, and also pushes the plunger 25 with the press portion 31 and the lever 26 to turn on the subswitch 22. With the press portion 31 having a predetermined length, the subswitch 22 is turned on earlier than the main switch 21.

The striking assembly 6 includes a tool holder 35. The tool holder 35 is rotatably held in a front portion of the inner housing 2. The tool holder 35 is cylindrical and extends in the front-rear direction. A countershaft 36 is supported in front of the rotational shaft 8 in the inner housing 2. A crankshaft 37 is supported behind the rotational shaft 8. The countershaft 36 and the crankshaft 37 each extend vertically. The countershaft 36 receives a gear 38. The crankshaft 37 receives a gear 39. The gear 38 and the gear 39 mesh with the pinion 10 on the rotational shaft 8. The countershaft 36 receives a first bevel gear 40 on its upper end.

The tool holder 35 is connected to a switching sleeve 41 with splines. Behind the switching sleeve 41, a second bevel gear 42 is externally attached to the rear end of the tool holder 35 in a rotatable manner. The second bevel gear 42 meshes with the first bevel gear 40 on the countershaft 36. With the switching sleeve 41 engaged at a backward position, the second bevel gear 42 transmits the rotation of the first bevel gear 40 to the tool holder 35. The switching sleeve 41 is switched between a forward position and the backward position with a switching knob 56, which is located on the rear surface of the upper outer housing 4.

The inner housing 2 holds a cylinder 43 in its rear portion. The cylinder 43 is coaxially placed in a rear portion of the tool holder 35. The cylinder 43 accommodates a piston 44 movable back and forth. The crankshaft 37 includes an eccentric pin 45 protruding from its upper portion. The piston 44 and the eccentric pin 45 are connected with a connecting rod 46. The cylinder 43 accommodates a striker 48 movable back and forth in front of the piston 44, with an air chamber 47 located between the piston 44 and the striker 48. The tool holder 35 includes an impact bolt 49 in front of the striker 48. The impact bolt 49 comes in contact with a bit B placed in the front end of the tool holder 35. The tool holder 35 includes an operation sleeve 50 externally attached to its front portion. The operation sleeve 50 is operable to attach and detach the bit B.

The switch lever 30 is pushed to turn on the main switch 21. The main switch 21 provides an on-signal through the main lead wire 24 to the tool-body controller 13, which then supplies power to the motor 7 to rotate the rotational shaft 8. The crankshaft 37 then rotates to move the piston 44 back and forth with the connecting rod 46. This causes the striker 48 to strike the bit B with the impact bolt 49. When the switching sleeve 41 is switched to the backward position with the switching knob 56, the mode is switched to a hammer drill mode. In the hammer drill mode, the rotation of the countershaft 36 is transmitted to the tool holder 35 with the second bevel gear 42. When the switching sleeve 41 is switched to the forward position, the mode is switched to a hammer mode. In the hammer mode, striking is simply performed without the tool holder 35 rotating.

The dust collection attachment 60 will now be described.

The dust collection attachment 60 includes a box-like casing 61. The casing 61 includes a main section 62, a front protruding section 63, and a rear protruding section 64. The main section 62 extends vertically. The front protruding section 63 extends frontward from an upper portion of the main section 62. A dust box 65 is detachably attachable to the front of the main section 62 and the bottom of the front protruding section 63. The rear protruding section 64 extends rearward from a lower portion of the main section 62. The main section 62 and the rear protruding section 64 can be fastened to the hammer drill 1.

A pair of dust-collector couplers 66 are located at the lateral center on the rear surface of the main section 62. The main section 62 includes a pair of dust-collector couplers 66 on its rear surface at the lateral center. The dust-collector couplers 66 are rails each having an L-shaped cross section and extending upward from the upper surface of the rear protruding section 64. As shown in FIG. 2, the dust-collector couplers 66 engage with the engagement grooves 15 on the tool-body coupler 14 from below. In this engagement state, the portion of the tool-body coupler 14 frontward from the engagement grooves 15 is located between the dust-collector couplers 66. This integrates the front cylinder 11 with the casing 61 in the front-rear direction. The main section 62 has a fitting recess 67 on its rear surface. With the dust collection attachment 60 being attached, the ball 17 fits into the fitting recess 67.

A pair of right and left side plates 68 extend from the rear surface of the main section 62 to the upper surface of the rear protruding section 64. The space between the pair of side plates 68 receives the front cylinder 11 in the hammer drill 1 from above.

Each side plate 68 has a recess 70 extending vertically on its outer surface. The recess 70 receives a hook plate 71. The hook plate 71 is a strip plate fitted in the recess 70 and extending vertically. As shown in FIG. 3, the hook plate 71 has the inner surface coupled to a shaft 72 in its intermediate portion. The shaft 72 extends in the front-rear direction in the recess 70. The hook plate 71 is pivotable about the shaft 72. A lower portion of the hook plate 71 is pressed laterally outward by a coil spring 73 between the hook plate 71 and the inner surface of the recess 70. Thus, the hook plate 71 is at a locking position at which its upper portion is urged laterally inward, as indicated by the solid lines in FIG. 3. The hook plate 71 includes, on its upper end, an engagement tab 74 protruding inward. At the locking position, the engagement tab 74 protrudes inward from the side plate 68 through a through-hole 75 in the recess 70. With the dust collection attachment 60 being attached to the hammer drill 1, the engagement tab 74 is engaged with the lateral engagement recess 19 on the front cylinder 11. When the lower portion of the hook plate 71 is pressed toward the recess 70, the hook plate 71 inclines to an unlocking position, as indicated by the two-dot-dash lines in FIG. 3. At the unlocking position, the engagement tab 74 is disengaged from the engagement recess 19.

The rear protruding section 64 includes a receiver 76 on its upper surface. With the dust collection attachment 60 being attached, the receiver 76 is in contact with the lower surface of the front cylinder 11. The rear protruding section 64 includes a connection cylinder 77 protruding upward on its upper surface behind the receiver 76. The connection cylinder 77 is located on the rear protruding section 64 at its lateral center. The connection cylinder 77 holds a male connector 78 extending upward. With the dust collection attachment 60 being attached, the connection cylinder 77 is connected to the connection port 28 on the lower surface of the front cylinder 11. The male connector 78 is thus connected to the female connector 29 in the connection port 28.

The front protruding section 63 accommodates a duct 80. The duct 80 has the front end (suction portion) that is open frontward at the front surface of the front protruding section 63. The duct 80 extends rearward in the front protruding section 63 and turns around in the main section 62. The duct 80 has the lower end that is open at the front surface of the main section 62 below the front protruding section 63.

The dust box (dust collector) 65 is attached to the casing 61 from the front below the front protruding section 63. The dust box 65 includes a lid 81 and a box body 82 that are hinged together at their lower ends. The lid 81 includes a filter 83 on its front inner surface. The box body 82 covers the filter 83 from the front.

The main section 62 includes an engagement shaft 84 extending laterally at the lower end of its front surface. The box body 82 has a receiving recess 85 extending laterally on its lower surface. The engagement shaft 84 is engaged with the receiving recess 85, and an elastic strip 86 located at the upper end of the lid 81 is engaged with the lower surface of the front protruding section 63. The dust box 65 is thus detachably attached to the casing 61. The lid 81 has an entry port 87 in its upper portion and an exit port 88 in its lower portion. The entry port 87 is connected to the lower end of the duct 80. The exit port 88 is located behind the filter 83.

The main section 62 includes a motor compartment 90 defined behind the exit port 88. With the dust box 65 being attached, the exit port 88 is aligned with an opening 91 in the front surface of the motor compartment 90 and is connected to the motor compartment 90.

The motor compartment 90 accommodates a dust collection motor 92. The dust collection motor 92 is held with a rotational shaft 93 extending downward. A dust collection fan (fan) 94 is fixed to the rotational shaft 93. The main section 62 has outlets (not shown) in its right and left surfaces radially outward from the dust collection fan 94.

The dust collection motor 92 is connected to positive and negative lead wires 95. The lead wires 95 extend through a partition between the main section 62 and the rear protruding section 64 to the internal space of the rear protruding section 64. The rear protruding section 64 accommodates a dust-collector controller 96 including a control circuit board (not shown). The lead wires 95 are electrically connected to the dust-collector controller 96. The dust-collector controller 96 is electrically connected to the male connector 78 through a signal lead wire 97.

The rear protruding section 64 accommodates a battery mount 100. A battery pack 101 is slid on and attached to the battery mount 100 from the rear to supply power to the dust collection attachment 60. The battery mount 100 includes a terminal block 102. The terminal block 102 is electrically connected to the attached battery pack 101. The terminal block 102 is electrically connected to the dust-collector controller 96 through a power lead wire 103.

The dust-collector controller 96 includes an indicator lamp 98. The indicator lamp 98 is exposed on the side surface of the rear protruding section 64. The indicator lamp 98 is, for example, a light-emitting diode (LED). The dust-collector controller 96 monitors the voltage of the battery pack 101 attached to the battery mount 100. When the voltage value of the battery pack 101 decreases to less than or equal to a predetermined threshold, the dust-collector controller 96 turns on or flashes the indicator lamp 98 to indicate the decrease in the voltage.

The rear protruding section 64 is placed below the front cylinder 11 in the hammer drill 1, with the engagement grooves 15 on the tool-body coupler 14 vertically aligned with the dust-collector couplers 66. The dust collection attachment 60 is then vertically moved relative to the hammer drill 1. This fits the dust-collector couplers 66 into the engagement grooves 15 from below.

The front cylinder 11 moving relatively downward comes in contact with the hook plates 71 on the side plates 68 and causes the hook plates 71 to pivot from the locking position to the unlocking position. This allows relative movement of the dust collection attachment 60. With the dust collection attachment 60 being attached, the engagement tabs 74 on the hook plates 71 are at the locking position and engaged with the engagement recesses 19 on the front cylinder 11. This restricts downward movement of the dust collection attachment 60 relative to the hammer drill 1. The attachment of the dust collection attachment 60 is thus complete. With the dust collection attachment 60 being attached, the ball 17 in the tool-body coupler 14 fits into the fitting recess 67 on the main section 62. This causes a click and presses the main section 62 to reduce rattling in the coupled state.

Upon completion of the attachment of the dust collection attachment 60, the connection cylinder 77 on the rear protruding section 64 is connected to the connection port 28 on the front cylinder 11. This connects the male connector 78 to the female connector 29. The subswitch 22 is thus electrically connected to the dust-collector controller 96 through the sub-lead wire 27 and the signal lead wire 97.

The bit B is attached to the hammer drill 1. The bit B is a dust suction bit having a dust suction path along its axis with a suction port at the front end. The bit can externally receive a hose fitting (not shown) on its outer circumference. A flexible hose 105 is connected between the hose fitting and the front end of the duct 80 in the dust collection attachment 60 in which a suction force is generated.

This defines a dust collection path R to allow air to flow between the bit B and the dust collection attachment 60. As indicated by the dashed arrows in FIG. 1, the dust collection path R extends from the bit B to the outlets through the flexible hose 105, the duct 80, the dust box 65, and the motor compartment 90.

To perform work using the dust collection system S, the switch lever 30 is pushed with the tip of the bit B pressed against the target surface of a target material. This turns on the subswitch 22 first. The subswitch 22 provides an on-signal through the sub-lead wire 27 and the signal lead wire 97 to the dust-collector controller 96. Upon receiving the on-signal, the dust-collector controller 96 receives power from the battery pack 101 through the terminal block 102 and the power lead wire 103, and supplies power to the dust collection motor 92 through the lead wires 95. This drives the dust collection motor 92 to rotate the rotational shaft 93 and the dust collection fan 94. This causes the dust collection path R to have a negative pressure to generate a suction force at the tip opening of the bit B.

The main switch 21 is turned on after the subswitch 22 is turned on. The main switch 21 provides an on-signal through the main lead wire 24 to the tool-body controller 13. Upon receiving the on-signal, the tool-body controller 13 receives utility power through the power cable 20 and supplies operating power to the motor 7. This drives the motor 7 to rotate the rotational shaft 8, which then rotates the countershaft 36 and the crankshaft 37. The piston 44 reciprocates independently of whether the hammer drill mode or the hammer mode is selected. This causes the striker 48 to strike the bit B with the impact bolt 49.

The power path extending from the power cable 20 through the tool-body controller 13 to the motor 7 is electrically separate from the power path extending from the battery pack 101 through the dust-collector controller 96 to the dust collection motor 92. The dust collection system S includes a responsive unit (the subswitch 22, the sub-lead wire 27, and the signal lead wire 97) that drives and stops the dust collection motor 92 in response to an operation on the main switch 21 with the responsive unit electrically separate from the signal path of the main switch 21.

This prevents transmission of any noise from the dust collection motor 92 to the power path in the hammer drill 1. The tool can thus pass an electromagnetic interference (EMI) test without any measures against noise.

Dust produced from the target material is sucked into the dust suction path in the bit B and enters the duct 80 through the flexible hose 105. The dust then enters the dust box 65 through the dust collection path R, is captured by the filter 83, and is collected in the box body 82.

When the work is complete, the switch lever 30 is released and the main switch 21 is turned off. The tool-body controller 13 stops power supply to the motor 7 to deactivate the hammer drill 1.

When the switch lever 30 is released and the subswitch 22 is turned off, the dust-collector controller 96 waits for a preset delay time (several seconds) to elapse after determining that the subswitch 22 has been turned off. After the delay time, the dust-collector controller 96 stops power supply to the dust collection motor 92. This causes dust remaining in the dust collection path R to move into the dust box 65 when the hammer drill 1 is deactivated.

To detach the dust collection attachment 60 from the hammer drill 1, the lower portions of the right and left hook plates 71 are pressed to move the hook plates 71 to the unlocking position. This disengages the engagement tabs 74 from the engagement recesses 19 on the front cylinder 11 to allow relative movement of the dust collection attachment 60. The dust collection attachment 60 is relatively moved away from the hammer drill 1 reversely from when the dust collection attachment 60 is attached. This disengages the dust-collector couplers 66 from the engagement grooves 15 on the tool-body coupler 14 downward. The detachment of the dust collection attachment 60 is thus complete.

To discard dust in the dust box 65, the elastic strip 86 is pushed down to be released from the front protruding section 63. The dust box 65 is pulled forward about the engagement shaft 84 to be detached from the casing 61. The lid 81 is opened to discard dust in the box body 82.

In the example described below, the dust collection attachment 60 is attached to a hammer drill with a different shape using an adapter.

Figure 4:
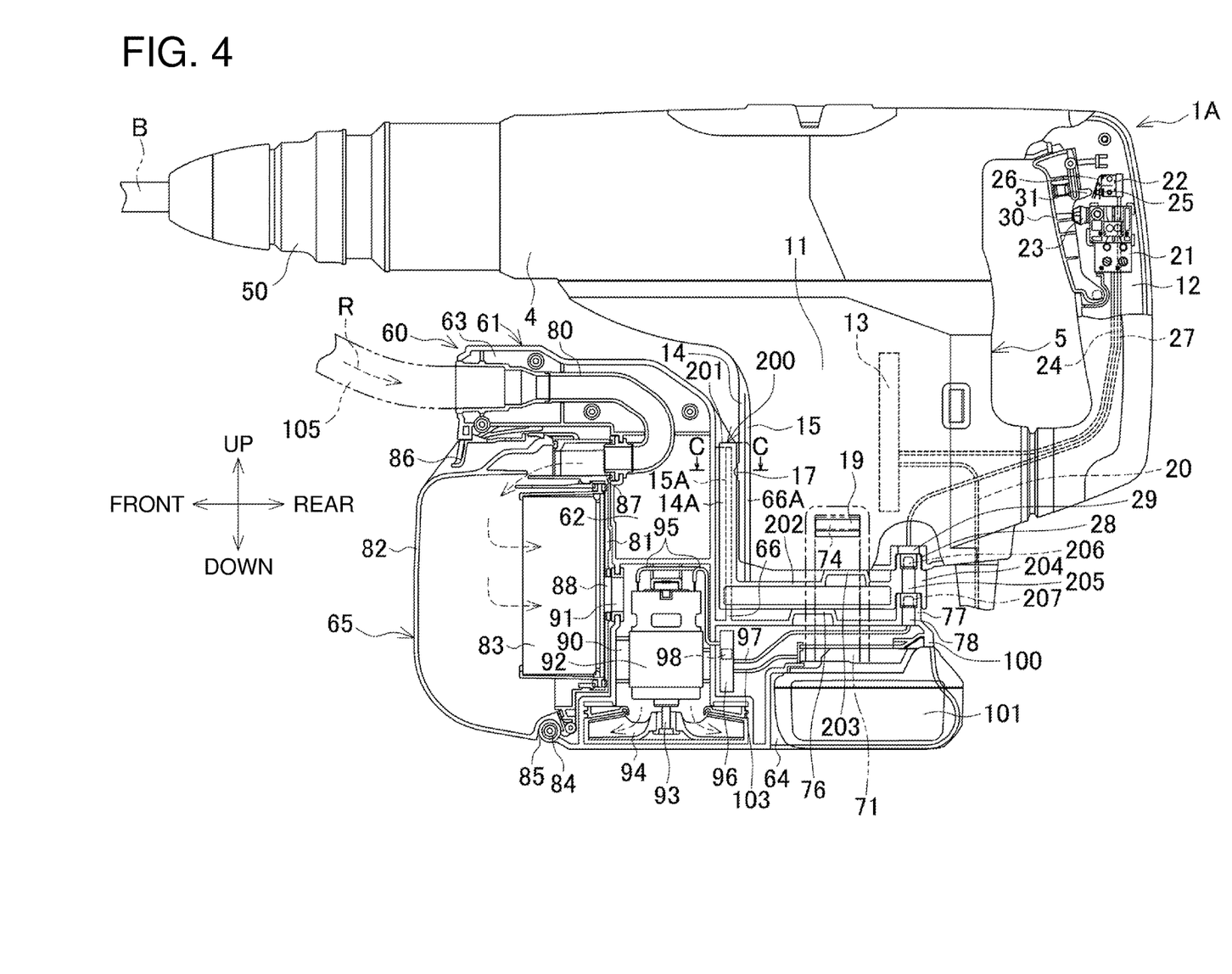
FIG. 4 is a longitudinal central sectional view of a dust collection system for a power tool in which an adapter-attached power tool dust collection attachment is attached to another hammer drill.

A hammer drill (a second power tool, or a power tool) 1A shown in FIG. 4 includes, on the front surface of the front cylinder 11, the same tool-body coupler 14 as the hammer drill 1 described above.

In the hammer drill 1A, the front cylinder 11 has a shorter vertical dimension than the front cylinder 11 in the hammer drill 1. When the receiver 76 on the upper surface of the rear protruding section 64 of the dust collection attachment 60 is in contact with the lower surface of the front cylinder 11, the engagement tabs 74 on the hook plates 71 and the engagement recesses 19 on the front cylinder 11 are not aligned vertically, with the engagement recesses 19 being lower than the engagement tabs 74. When the tool-body coupler 14 is engaged with the dust-collector couplers 66, the engagement tabs 74 and the engagement recesses 19 are not aligned in the front-rear direction, with the engagement recesses 19 being frontward from the engagement tabs 74.

An adapter 200 is thus used. The adapter 200 includes a vertical plate 201 and a lateral plate 202. The vertical plate 201 is located between the front cylinder 11 and the main section 62. The lateral plate 202 is located between the front cylinder 11 and the rear protruding section 64.

Figure 5:
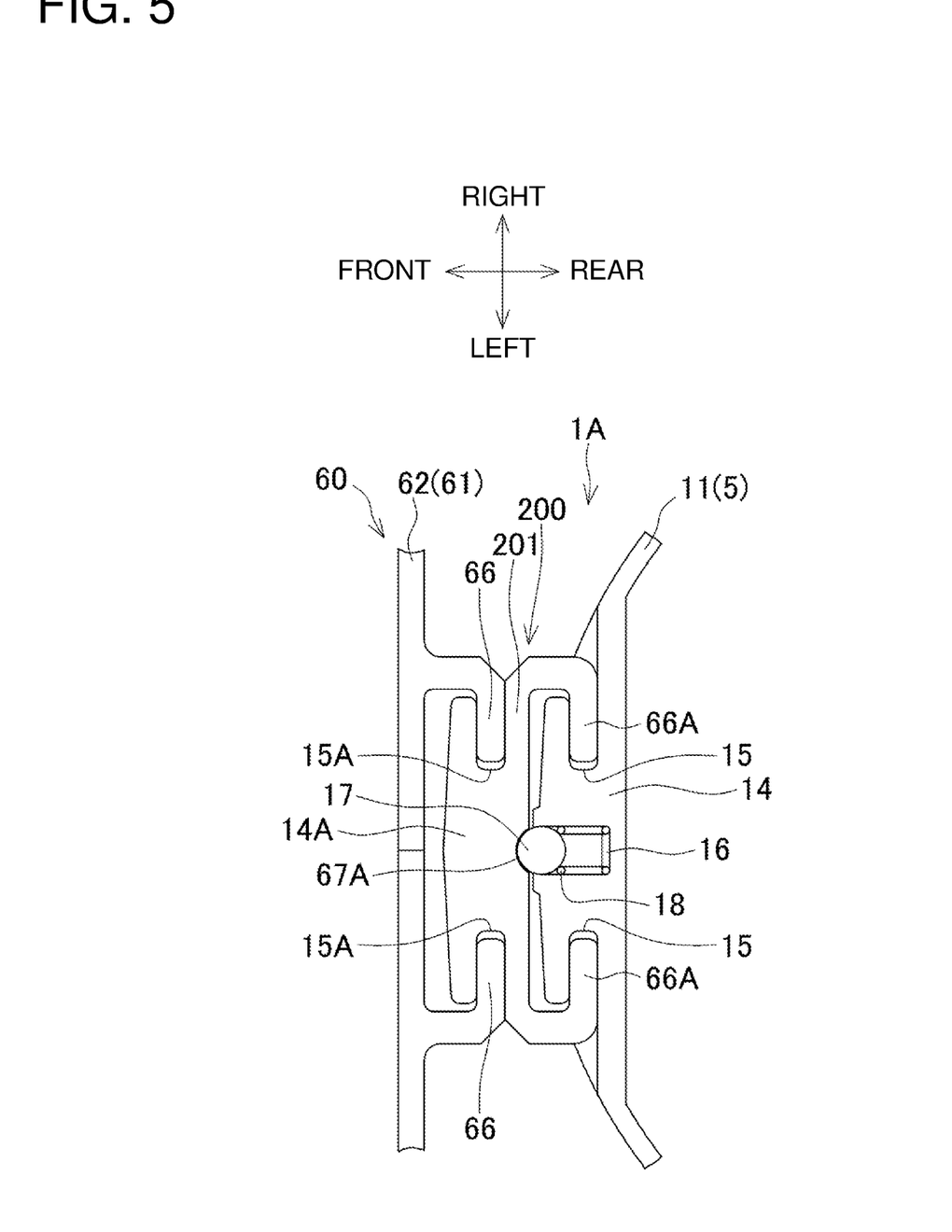
FIG. 5 is an enlarged sectional view taken along line C-C in FIG. 4.

As shown in FIG. 5, the vertical plate 201 includes a front coupler 14A and rear couplers 66A. The front coupler 14A has the same shape as the tool-body coupler 14 in the hammer drill 1. The front coupler 14A has right and left engagement grooves 15A that are the same as the engagement grooves 15. The rear couplers 66A have the same shape as the dust-collector couplers 66. The vertical plate 201 has, on its rear surface, a fitting recess 67A to receive the ball 17 in the tool-body coupler 14. The distance between each engagement groove 15A and the corresponding rear coupler 66A in the front-rear direction is equal to the distance by which each engagement tab 74 is shifted rearward from the corresponding engagement recess 19 in the front-rear direction when the tool-body coupler 14 and the dust-collector couplers 66 are directly coupled without the adapter 200.

The lateral plate 202 includes an upper receiver 203 on its upper surface. The upper receiver 203 has the same shape as the receiver 76. The vertical distance between the lower surface of the lateral plate 202 and the upper surface of the upper receiver 203 is equal to the vertical distance by which each engagement tab 74 is shifted upward from the corresponding engagement recess 19 when the tool-body coupler 14 and the dust-collector couplers 66 are directly connected without the adapter 200.

The lateral plate 202 includes an intermediate cylinder 204 at its lateral center behind the upper receiver 203. The intermediate cylinder 204 extends vertically. The upper end of the intermediate cylinder 204 is fittable with the connection port 28 in the hammer drill 1A. The lower end of the intermediate cylinder 204 is fittable with the connection cylinder 77 in the dust collection attachment 60.

The intermediate cylinder 204 holds a metal connector 205. The metal connector 205 has a male part 206 at the upper end and a female part 207 at the lower end. The male part 206 is placeable into and connectable to the female connector 29 in the connection port 28. The male connector 78 in the connection cylinder 77 is placeable into and connectable to the female part 207.

To attach the dust collection attachment 60 to the hammer drill 1A using the adapter 200, the adapter 200 is attached to the dust collection attachment 60 first. The front coupler (mechanical coupler) 14A in the vertical plate 201 in the adapter 200 is slid downward relative to the dust-collector couplers 66 from above the dust-collector coupler 66 until the receiver 76 on the rear protruding section 64 comes in contact with the lower surface of the lateral plate 202. This engages the dust-collector couplers 66 with the engagement grooves 15A on the front coupler 14A and couples the vertical plate 201 to the main section 62. This also places the connection cylinder 77 into the intermediate cylinder 204. The male connector 78 is thus placed into and connected to the female part 207 in the metal connector 205.

The tool-body coupler 14 in the hammer drill 1A is then slid downward relative to the adapter 200 from above the rear couplers (mechanical couplers) 66A in the adapter 200 until the upper receiver 203 on the lateral plate 202 comes in contact with the lower surface of the front cylinder 11. This engages the rear couplers 66A with the engagement grooves 15 on the tool-body coupler 14 and couples the vertical plate 201 to the front cylinder 11. This also engages the engagement tab 74 in each hook plate 71 with the corresponding engagement recess 19 and attaches the dust collection attachment 60 to the hammer drill 1A. This also places the intermediate cylinder 204 into the connection port 28. The male part 206 in the metal connector (electrical connector) 205 is thus placed into and connected to the female connector 29.

The hammer drill 1A and the dust collection attachment 60 are thus coupled to each other with the adapter 200. At the same time, the subswitch 22 in the hammer drill 1A is electrically connected to the dust-collector controller 96 with the sub-lead wire 27, the metal connector 205, and the signal lead wire 97.

The dust collection attachment 60 and the dust collection system S in the first embodiment include the adapter 200 attachable to the hammer drill 1A and detachably attachable to the casing 61. The adapter 200 includes the front coupler 14A and the rear couplers 66A that couple the casing 61 and the hammer drill 1A, and includes the metal connector 205 that electrically connects the dust collection attachment 60 and the hammer drill 1A when the dust collection attachment 60 is coupled to the hammer drill 1A.

This structure allows the self-suction dust collection attachment 60 including the dust collection motor 92 and the dust collection fan 94 to be both mechanically coupled and electrically connected to each of the hammer drill 1 and the hammer drill 1A.

The metal connector 205 electrically connects the main switch 21 in the hammer drill 1A and the dust-collector controller 96 in the casing 61 to control the dust collection motor 92.

Thus, the dust collection motor 92 can be driven in response to an operation on the main switch 21 in the hammer drill 1A.

The adapter 200 is attached to each of the casing 61 and the hammer drill 1A when moved in the same direction that is the vertical direction relative to the casing 61 and the hammer drill 1A.

Thus, the casing 61 can be smoothly attached to the hammer drill 1A in a short time using the adapter 200.

The adapter 200 has an attachment surface to receive the hammer drill 1A and an attachment surface to receive the casing 61 opposite to the attachment surface to receive the hammer drill 1A in the front-rear direction. In the present embodiment, the adapter 200 has the attachment surface to receive the hammer drill 1A on the rear of the front attachment surface to receive the casing 61.

Thus, the two attachment surfaces are readily identifiable, allowing the adapter 200 to be attached to the casing 61 and to the hammer drill 1A correctly in sequence.

The adapter 200 includes the front coupler 14A and the rear couplers 66A on surfaces different from a surface on which the metal connector 205 is located.

Thus, the mechanical couplers and the electrical connector for the casing 61 and the hammer drill 1A can be arranged without interfering with each other.

The casing 61 extends over the hammer drill 1A from the front portion to the lower portion of the hammer drill 1A. The front coupler 14A and the rear couplers 66A are located between the rear surface of the casing 61 and the front surface of the hammer drill 1A. The metal connector 205 is located between the upper surface of the casing 61 and the lower surface of the hammer drill 1A.

Thus, mechanical coupling and electrical connection to the casing 61 and the hammer drill 1A can be achieved easily in a small space using the shape of the casing 61.

Second Embodiment

The hammer drill in the first embodiment is powered by alternating current (AC), but the adapter according to one or more embodiments of the disclosure is also usable with a hammer drill powered by direct current (DC) from a battery pack. A second embodiment will now be described.

Figure 6:
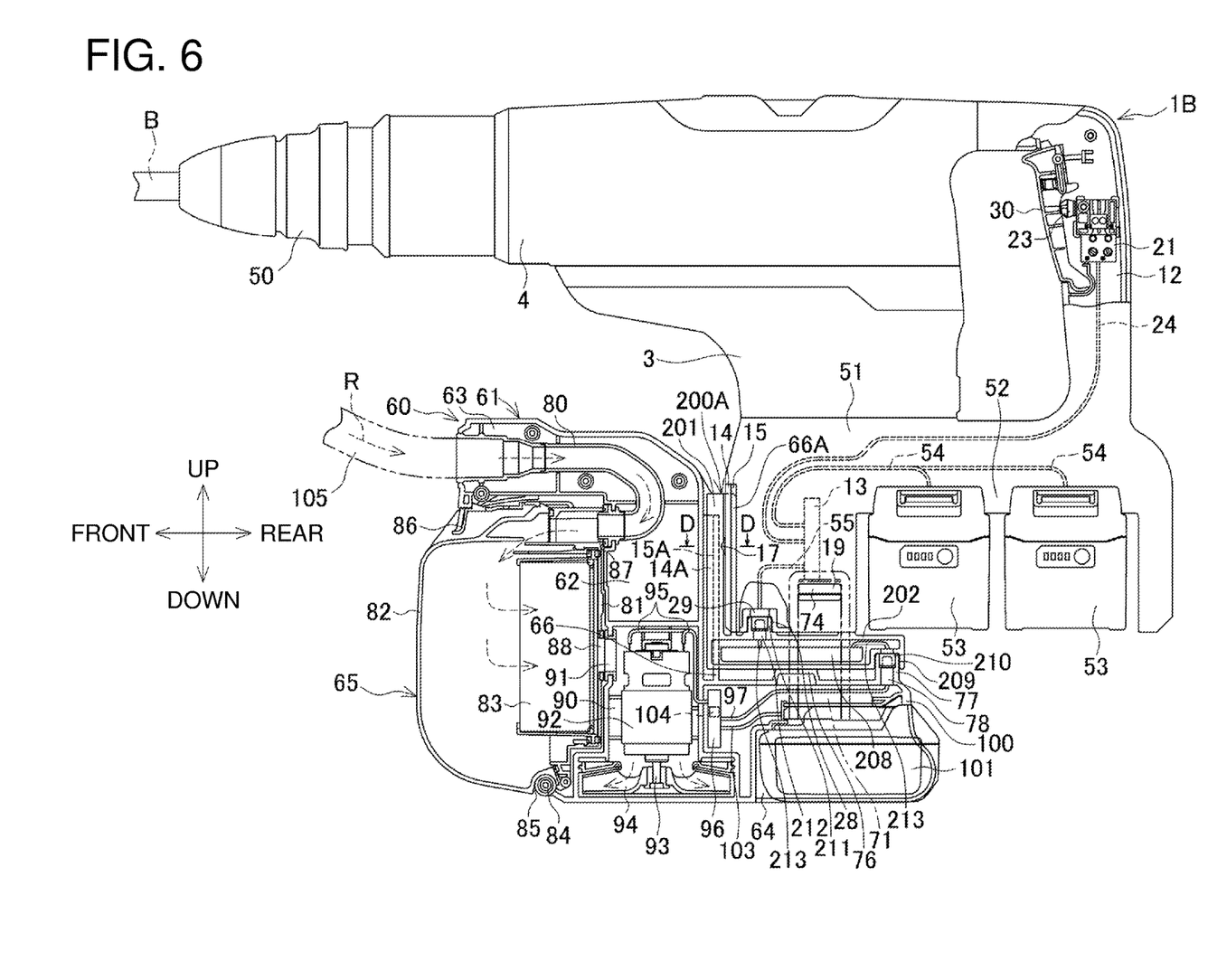
FIG. 6 is a longitudinal central sectional view of a dust collection system for a power tool in which an adapter-attached power tool dust collection attachment according to a second embodiment is attached to another hammer drill.

A hammer drill (a second power tool, or a power tool) 1B shown in FIG. 6 includes a lower housing 51 integral with the handle 12 below a motor housing 3. The lower housing 51 has a tool-body battery mount 52 in its rear portion. Two tool-body battery packs (tool-body batteries) 53 are slid on and attached to the tool-body battery mount 52 from the left. The rated voltage (e.g., 40 V) of each tool-body battery pack 53 is greater than the rated voltage (e.g., 18 V) of the battery pack (dust-collector battery) 101 in the dust collection attachment 60. The tool-body controller 13 is located frontward from the tool-body battery mount 52 in the lower housing 51.

The handle 12 includes no subswitch and includes a main switch 21 alone. The main switch 21 is electrically connected to the tool-body controller 13 through the main lead wire 24. The tool-body battery mount 52 includes terminal blocks (not shown) in its front and rear portions. The terminal blocks are electrically connected to the attached two tool-body battery packs 53. Each terminal block is electrically connected to the tool-body controller 13 through a second tool-body lead wire 54.

The connection port 28 is located in a lower front portion of the lower housing 51. The connection port 28 includes the female connector 29 electrically connected to the tool-body controller 13 through a third tool-body lead wire 55.

An adapter 200A includes a vertical plate 201 with the same structure as the vertical plate 201 in the first embodiment and a lateral plate 202 accommodating a converter 208 inside. The lateral plate 202 has a connection recess 209 at the lateral center of its rear lower surface. The connection recess 209 can receive the connection cylinder 77 on the rear protruding section 64. The connection recess 209 includes a female terminal 210. The male connector 78 in the connection cylinder 77 is placed into and connected to the female terminal 210.

The lateral plate 202 includes a connection protrusion 211 at the lateral center of its front upper surface. The connection protrusion 211 is fittable with the connection port 28 in the front cylinder 11. The connection protrusion 211 includes a male terminal 212. The male terminal 212 is placed into and connected to the female connector 29 in the connection port 28. Each of the female terminal 210 and the male terminal 212 is electrically connected to the converter 208 with an internal lead wire 213.

Figure 7:
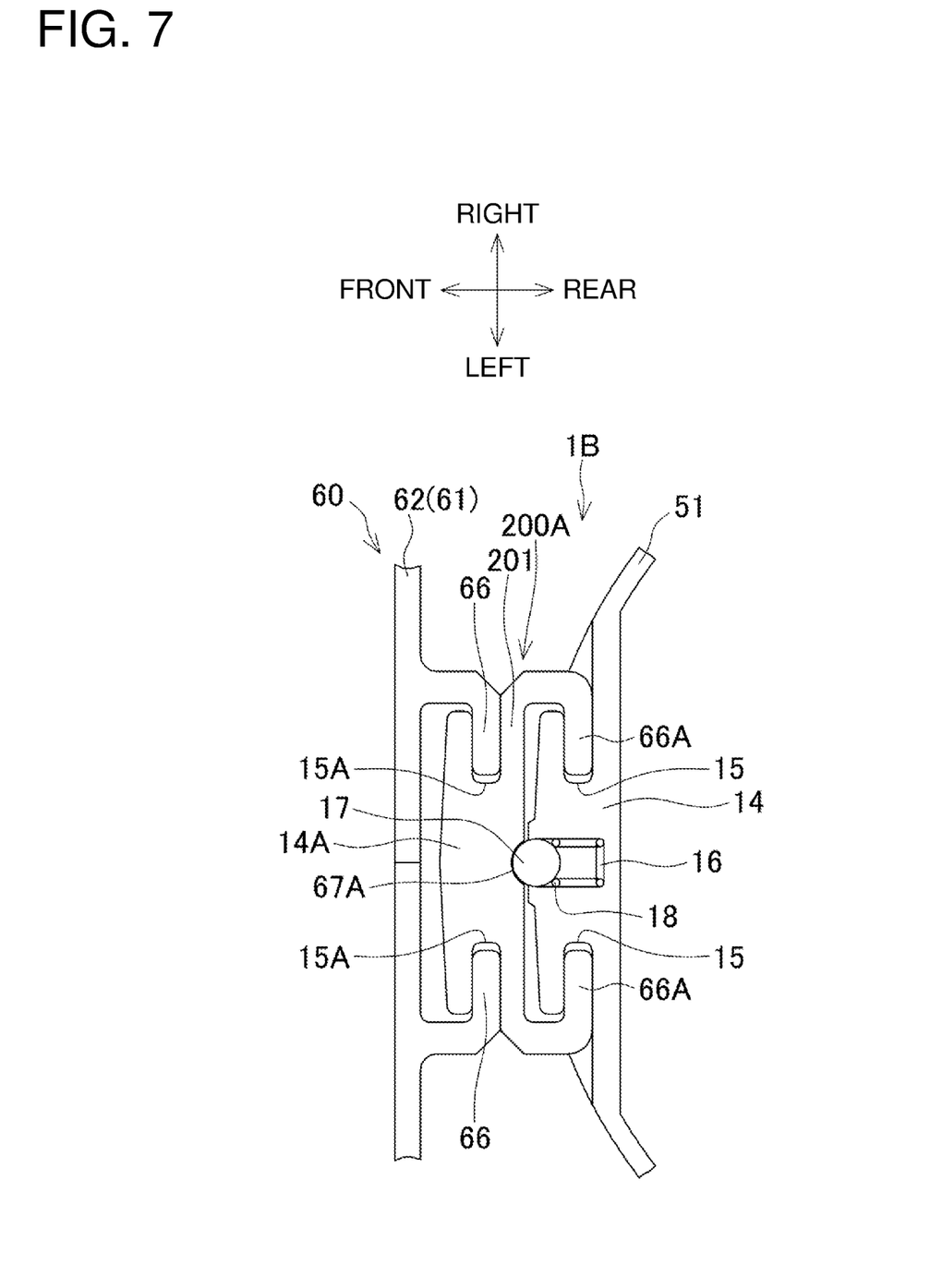
FIG. 7 is an enlarged sectional view taken along line D-D in FIG. 6.

To attach the dust collection attachment 60 to the hammer drill 1B using the adapter 200A, the adapter 200A is attached to the dust collection attachment 60 first. As in the first embodiment, the front coupler 14A in the vertical plate 201 is slid downward relative to the dust-collector couplers 66 from above the dust-collector coupler 66 until the receiver 76 on the rear protruding section 64 comes in contact with the lower surface of the lateral plate 202. This engages the dust-collector coupler 66 with the engagement grooves 15A on the front coupler 14A and couples the vertical plate 201 to the main section 62, as shown in FIG. 7. This also fits the connection cylinder 77 into the connection recess 209. The male connector 78 is thus placed into and connected to the female terminal 210.

The tool-body coupler 14 in the hammer drill 1B is then slid downward relative to the adapter 200A from above the rear couplers 66A in the adapter 200A until the upper surface of the lateral plate 202 comes in contact with the lower surface of the front cylinder 11. This engages the rear couplers 66A with the engagement grooves 15 on the tool-body coupler 14 and couples the vertical plate 201 to the front cylinder 11. This also engages the engagement tab 74 in each hook plate 71 with the corresponding engagement recess 19 and attaches the dust collection attachment 60 to the hammer drill 1B. This also places the connection protrusion 211 into the connection port 28. The male terminal 212 is thus placed into and connected to the female connector 29.

The hammer drill 1B and the dust collection attachment 60 are thus coupled to each other with the adapter 200A. At the same time, the tool-body controller 13 is electrically connected to the dust-collector controller 96 through the third tool-body lead wire 55, one of the internal lead wires 213, the converter 208, the other of the internal lead wires 213, and the signal lead wire 97.

In the second embodiment, when the power level of the battery pack 101 in the dust collection attachment 60 decreases and cannot provide a voltage for driving the dust collection motor 92, the tool-body controller 13, which has obtained such information from the dust-collector controller 96, supplies power from the tool-body battery packs 53 to the dust collection motor 92. The power supply voltage of each tool-body battery pack 53 is lowered by the converter 208 to a power supply voltage appropriate for the dust collection motor 92 before being applied.

The dust collection attachment 60 and the dust collection system S according to the second embodiment include the adapter 200A attachable to the hammer drill 1B and detachably attachable to the casing 61. The adapter 200A includes the front coupler 14A and the rear couplers 66A that couple the casing 61 and the hammer drill 1B, and includes the electrical connectors (the female terminal 210, the internal lead wires 213, the converter 208, and the male terminal 212) that electrically connect the dust collection attachment 60 and the hammer drill 1B when the dust collection attachment 60 is coupled to the hammer drill 1B.

This structure allows the self-suction dust collection attachment 60 including the dust collection motor 92 and the dust collection fan 94 to be both mechanically coupled and electrically connected to each of the hammer drill 1 and the hammer drill 1B.

More specifically, the electrical connectors (the female terminal 210, the internal lead wires 213, the converter 208, and the male terminal 212) allow power to be supplied from the hammer drill 1B.

The power supply for the hammer drill 1B can be used to power the dust collection attachment 60 with the adapter 200A, thus improving usability.

The hammer drill 1B includes the tool-body battery packs 53 to supply power. The casing 61 includes the battery pack 101 with a rated voltage different from the rated voltage of each tool-body battery pack 53. The adapter 200A includes the converter 208 to convert the rated voltage of each tool-body battery pack 53 to the rated voltage of the battery pack 101.

Thus, power from the hammer drill 1B that includes the tool-body battery packs 53 each with a different rated voltage can be used to power the dust collection attachment 60.

Third Embodiment

Figure 8:
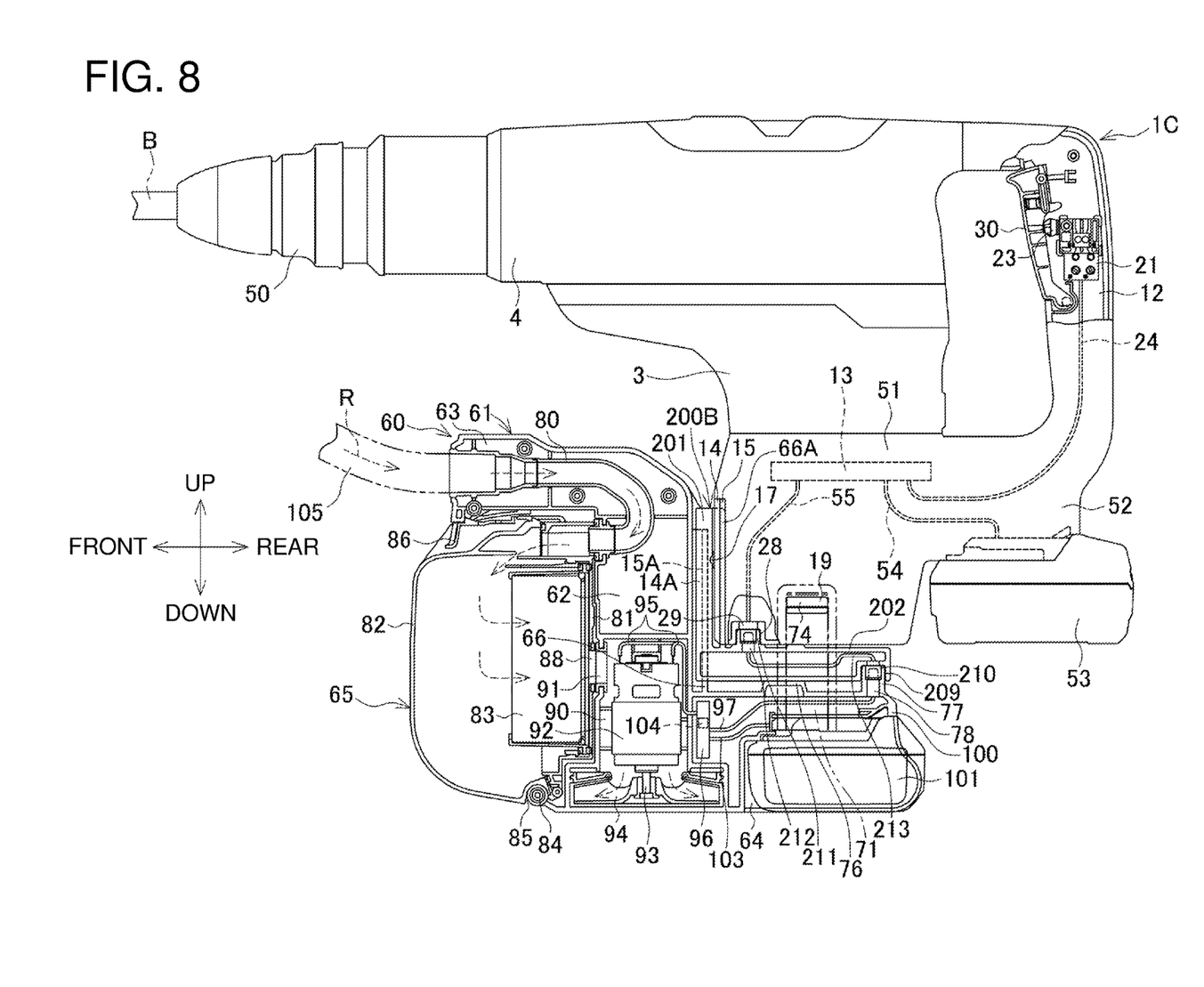
FIG. 8 is a longitudinal central sectional view of a dust collection system for a power tool in which an adapter-attached power tool dust collection attachment according to a third embodiment is attached to another hammer drill.

In a hammer drill (a second power tool, or a power tool) 1C shown in FIG. 8, a tool-body battery pack 53 is slid and attached to the tool-body battery mount 52 in the lower housing 51 from the rear. The tool-body battery pack 53 has the same rated voltage as the battery pack 101 in the dust collection attachment 60.

An adapter 200B includes the same vertical plate 201 as in the second embodiment and a lateral plate 202 including no converter. The female terminal 210 and the male terminal 212 are directly electrically connected to the internal lead wire 213. The tool-body controller 13 extends in the front-rear direction in an upper front portion of the lower housing 51.

To attach the dust collection attachment 60 to the hammer drill 1C using the adapter 200B, the adapter 200B is attached to the dust collection attachment 60 first. As in the second embodiment, the front coupler (mechanical coupler) 14A in the vertical plate 201 is slid downward relative to the dust-collector couplers 66 from above the dust-collector couplers 66 until the receiver 76 on the rear protruding section 64 comes in contact with the lower surface of the lateral plate 202. As in FIG. 7, this engages the dust-collector couplers 66 with the front coupler 14A to couple the vertical plate 201 to the main section 62. This also places the connection cylinder 77 into the connection recess 209. The male connector 78 is thus placed into and connected to the female terminal 210.

The tool-body coupler 14 in the hammer drill 1C is then slid downward relative to the adapter 200B from above the rear couplers 66A in the adapter 200B until the upper surface of the lateral plate 202 comes in contact with the lower surface of the front cylinder 11. This engages the rear couplers 66A with the tool-body coupler 14 to couple the vertical plate 201 to the front cylinder 11. This also engages the engagement tabs 74 on the hook plates 71 with the engagement recesses 19 and attaches the dust collection attachment 60 to the hammer drill 1C. This also places the connection protrusion 211 into the connection port 28. The male terminal 212 is thus placed into and connected to the female connector 29.

The hammer drill 1C and the dust collection attachment 60 are thus coupled to each other with the adapter 200B. At the same time, the tool-body controller 13 is electrically connected to the dust-collector controller 96 through the third tool-body lead wire 55, the internal lead wire 213, and the signal lead wire 97.

In the third embodiment, when the power level of the battery pack 101 in the dust collection attachment 60 decreases and cannot provide a voltage for driving the dust collection motor 92, the tool-body controller 13, which has obtained such information from the dust-collector controller 96, supplies power from the tool-body battery pack 53 to the dust collection motor 92.

The dust collection attachment 60 and the dust collection system S according to the third embodiment include the adapter 200B attachable to the hammer drill 1C and detachably attachable to the casing 61. The adapter 200B includes the front coupler 14A and the rear couplers 66A that couple the casing 61 and the hammer drill 1C, and includes the electrical connectors (the female terminal 210, the internal lead wire 213, and the male terminal 212) that electrically connect the dust collection attachment 60 and the hammer drill 1C when the dust collection attachment 60 is coupled to the hammer drill 1C.

This structure allows the self-suction dust collection attachment 60 including the dust collection motor 92 and the dust collection fan 94 to be both mechanically coupled and electrically connected to each of the hammer drill 1 and the hammer drill 1C.

The hammer drill 1C includes the tool-body battery pack 53 to supply power. The casing 61 includes the battery pack 101 with the same rated voltage as the tool-body battery pack 53. The dust-collector controller 96 is operable with the tool-body battery pack 53 and the battery pack 101 to control the dust collection motor 92.

Thus, the dust collection motor 92 can be driven by power from the tool-body battery pack 53 when the battery pack 101 runs out of power.

Modifications of the disclosure will now be described.

In the above embodiments, the tool-body coupler is a ridge and the dust-collector couplers are a pair of rails, but their structures can be reversed. In this case, the mechanical couplers in the adapter include the front couplers being a pair of rails and the rear coupler being a ridge. In another example, the ridge may be replaced with a pair of rails, and two couplers each including a pair of rails may achieve mechanical coupling.

In the above embodiments, the hammer drill and the dust collection attachment are coupled using the tool-body coupler and the dust-collector couplers at the lateral center, but they may be coupled using tool-body couplers and dust-collector couplers located at both of the lateral ends. The mechanical couplers in the adapter may also be located at both of the lateral ends.

The tool-body coupler and the dust-collector couplers may have shapes other than extending in the vertical direction. Couplers divided into upper portions and lower portions may be engaged with each other. The front coupler and the rear couplers in the adapter may also be divided into upper and lower portions.

In the above embodiments, separately from the tool-body coupler, the dust-collector couplers, and the mechanical couplers in the adapter, the hook plates on the left and right of the rear protruding section in the dust collection attachment lock the dust collection attachment against sliding, but such locking members may be included in the main section. For example, a locking tab protruding from and urged by the main section may engage with the front surface of the hammer drill, and the locking tab may be retracted by a releasing operation on the main section.

The ball and the coil spring included in the tool-body coupler may be included in the adapter.

In the above embodiments, the adapter is used to attach the dust collection attachment to one type of hammer drill, but the adapter may allow the dust collection attachment to be attached to two or more types of hammer drills.

In the hammer drill, the position and orientation of the motor and the position and orientation of the tool-body controller are not limited to those in the above embodiments. For example, the motor may have the rotational shaft extending frontward or diagonally frontward.

The structure of the striking assembly is not limited to that in the above embodiments. The selectable operational modes may include a drill mode.

The power tool is not limited to a hammer drill but may be another power tool such as an electric hammer.

Although the dust suction bit is attached to the power tool as a tip tool in the above embodiments, a tip tool other than the dust suction bit may be attached. In this case, a cylindrical attachment with a hose fitting may be attached to the tip of the power tool to cover the outer surface of the tip tool. The hose fitting may be connected to the suction portion in the dust collection attachment using a flexible hose.

The dust collection attachment may be attached to the power tool in, for example, the front-rear direction, rather than in the vertical direction.

In the dust collection attachment, the position and orientation of the dust collection motor and the position and orientation of the dust box are not limited to those in the above embodiments. For example, the dust collection motor may be accommodated with its rotational shaft extending upward or laterally. The dust collection motor and the fan may have separate shafts, and rotation may be transmitted from the rotational shaft of the dust collection motor to the shaft of the fan.

The dust collector is not limited to a dust box and may have a cyclone structure with no filter. The dust collection path may thus be modified as appropriate.

The battery pack may be slid laterally, rather than from the rear, to be attached to the battery mount in the dust collection attachment. Multiple battery packs may be attached.

In the dust collection attachment, the flexible hose may be connected to, for example, the upper surface or the side surface of the casing, rather than the front surface. The dust collection attachment may be attached without a flexible hose. For example, the dust collection attachment may include a sliding cylinder defining a dust collection path inside and protruding from the casing. The sliding cylinder may have a suction port at the tip to receive a tip tool.

REFERENCE SIGNS LIST 1, 1A to 1C hammer drill
2 inner housing
3 motor housing
4 upper outer housing
5 lower outer housing
6 striking assembly
7 motor
8 rotational shaft
11 front cylinder
12 handle
13 tool-body controller
14 tool-body coupler
15 engagement groove
19 engagement recess
20 power cable
21 main switch
22 subswitch
24 main lead wire
27 sub-lead wire
29 female connector
30 switch lever
35 tool holder
44 piston
48 striker
49 impact bolt
51 lower housing
52 tool-body battery mount
53 tool-body battery pack
60 dust collection attachment
61 casing
62 main section
65 dust box
66 dust-collector coupler
71 hook plate
78 male connector
83 filter
92 dust collection motor
94 dust collection fan
96 dust-collector controller
97 signal lead wire
101 battery pack
103 power lead wire
200, 200A, 200B adapter
201 vertical plate
202 lateral plate
14A front coupler
15A engagement groove
66A rear coupler
208 converter
B bit
R dust collection path
S dust collection system for power tool

What is claimed is:

1. A power tool dust collection attachment attachable to a first power tool, the dust collection attachment comprising:
    a casing;
    a suction portion;
    a dust collector configured to capture dust sucked through the suction portion;
    a fan configured to generate a suction force in the suction portion;
    a dust collection motor configured to rotate the fan; and
    an adapter attachable to at least a second power tool and detachably attachable to the casing, the adapter including
        a mechanical coupler configured to couple the casing and the second power tool, and
        an electrical connector configured to electrically connect the dust collection attachment and the second power tool when the dust collection attachment is coupled to the second power tool.

2. The power tool dust collection attachment according to claim 1, wherein
    the electrical connector electrically connects a switch in the second power tool and a dust-collector controller in the casing to control the dust collection motor.

3. The power tool dust collection attachment according to claim 2, wherein
    the electrical connector allows power to be supplied from the second power tool.

4. The power tool dust collection attachment according to claim 3, wherein
    the second power tool includes a tool-body battery to supply power,
    the casing includes a dust-collector battery with a same rated voltage as the tool-body battery, and
    the dust-collector controller is operable with the tool-body battery and the dust-collector battery to control the dust collection motor.

5. The power tool dust collection attachment according to claim 3, wherein
    the second power tool includes a tool-body battery to supply power,
    the casing includes a dust-collector battery with a rated voltage different from a rated voltage of the tool-body battery, and
    the adapter includes a converter configured to convert the rated voltage of the tool-body battery to the rated voltage of the dust-collector battery.

6. The power tool dust collection attachment according to claim 1, wherein
    the adapter is attached to each of the casing and the second power tool when moved in a first direction relative to the casing and the second power tool.

7. The power tool dust collection attachment according to claim 6, wherein the adapter has an attachment surface to receive the second power tool and an attachment surface to receive the casing opposite to the attachment surface to receive the second power tool in a second direction intersecting with the first direction.

8. The power tool dust collection attachment according to claim 1, wherein
the adapter includes the mechanical coupler and the electrical connector on surfaces of the adapter different from each other.

9. The power tool dust collection attachment according to claim 8, wherein
the casing extends over the second power tool from a front portion to a lower portion of the second power tool,
the mechanical coupler is located between a rear surface of the casing and a front surface of the second power tool, and
the electrical connector is located between an upper surface of the casing and a lower surface of the second power tool.

10. The power tool dust collection attachment according to claim 2, wherein
the adapter is attached to each of the casing and the second power tool when moved in a first direction relative to the casing and the second power tool.

11. The power tool dust collection attachment according to claim 3, wherein
the adapter is attached to each of the casing and the second power tool when moved in a first direction relative to the casing and the second power tool.

12. The power tool dust collection attachment according to claim 4, wherein
the adapter is attached to each of the casing and the second power tool when moved in a first direction relative to the casing and the second power tool.

13. The power tool dust collection attachment according to claim 5, wherein
the adapter is attached to each of the casing and the second power tool when moved in a first direction relative to the casing and the second power tool.

14. The power tool dust collection attachment according to claim 2, wherein
the adapter includes the mechanical coupler and the electrical connector on surfaces of the adapter different from each other.

15. The power tool dust collection attachment according to claim 3, wherein
the adapter includes the mechanical coupler and the electrical connector on surfaces of the adapter different from each other.

16. The power tool dust collection attachment according to claim 4, wherein
the adapter includes the mechanical coupler and the electrical connector on surfaces of the adapter different from each other.

17. The power tool dust collection attachment according to claim 5, wherein
the adapter includes the mechanical coupler and the electrical connector on surfaces of the adapter different from each other.

18. The power tool dust collection attachment according to claim 6, wherein
the adapter includes the mechanical coupler and the electrical connector on surfaces of the adapter different from each other.

19. The power tool dust collection attachment according to claim 7, wherein
the adapter includes the mechanical coupler and the electrical connector on surfaces of the adapter different from each other.

20. A power tool, comprising:
the power tool dust collection attachment according to claim 1; and
the adapter attachable to the power tool dust collection attachment.

* * * * *